(12) United States Patent
Mooney et al.

(10) Patent No.: US 6,587,694 B1
(45) Date of Patent: Jul. 1, 2003

(54) CLOCK SYNCHRONIZATION BETWEEN WIRELESS DEVICES DURING CRADLED TIME

(75) Inventors: Philip D. Mooney, North Wales, PA (US); Richard L. McDowell, Chalfont, PA (US); Jeffrey P. Grundvig, Macungie, PA (US); Jian Wu, Macungie, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/404,807

(22) Filed: Sep. 24, 1999

(51) Int. Cl.⁷ .............................................. H04L 27/30
(52) U.S. Cl. ........................ 455/502; 455/462; 370/357
(58) Field of Search ................................ 455/502, 572, 455/41, 462, 573; 370/350; 375/354, 355, 357

(56) References Cited

U.S. PATENT DOCUMENTS

| | | | |
|---|---|---|---|
| 5,307,370 A | * | 4/1994 | Eness .......................... 375/135 |
| 5,463,351 A | | 10/1995 | Marko |
| 5,719,827 A | * | 2/1998 | Diep et al. ..................... 368/47 |
| 5,841,823 A | | 11/1998 | Tuijn |
| 6,111,927 A | * | 8/2000 | Sokoler ....................... 375/365 |

\* cited by examiner

Primary Examiner—Thanh Cong Le
Assistant Examiner—Nick Corsaro
(74) Attorney, Agent, or Firm—William H. Bollman (57) ABSTRACT

Clocks between at least two wireless devices are synchronized to reduce the need to transmit synchronization signals over a wireless communication channel therebetween. Two wireless devices synchronize their respective clocks with each other when each are electrically coupled, e.g., during a cradle time when brought into physical contact with each other through charge contacts, e.g., to recharge a remote portable unit. The charge signal appearing at the charge contacts is driven to create a time duration marked by a start transition and an end transition in the charge signal. The number of clock pulses of each of the two wireless devices during the time duration is counted, and compared to determine the difference in clock speeds of the wireless devices. The frequency of the clock of at least one of the wireless devices is adjusted to bring the difference in the clock speeds within a predetermined threshold tolerance level.

32 Claims, 6 Drawing Sheets

OSCILLATOR SYNCHRONIZATION ROUTINE (BASE UNIT)

CLOCK SYNCHRONIZATION BETWEEN WIRELESS DEVICES DURING CRADLED TIME

BACKGROUND OF THE INVENTION

1. Field of the Invention

This invention relates generally to electronic devices, such as a cordless telephone. More particularly, it relates to a method and device to synchronize clocks of two wireless devices, e.g., a wireless portable device with its base device.

2. Background of Related Art

A wireless device, e.g., a cordless telephone, wireless keyboard, wireless mouse, a digital personal assistant (PDA), or a notebook computer, etc., must keep its own internal clock in synchronization with an associated base unit or station, e.g., a telephone base unit, or a desk top computer, for communications therebetween.

Figure 5:
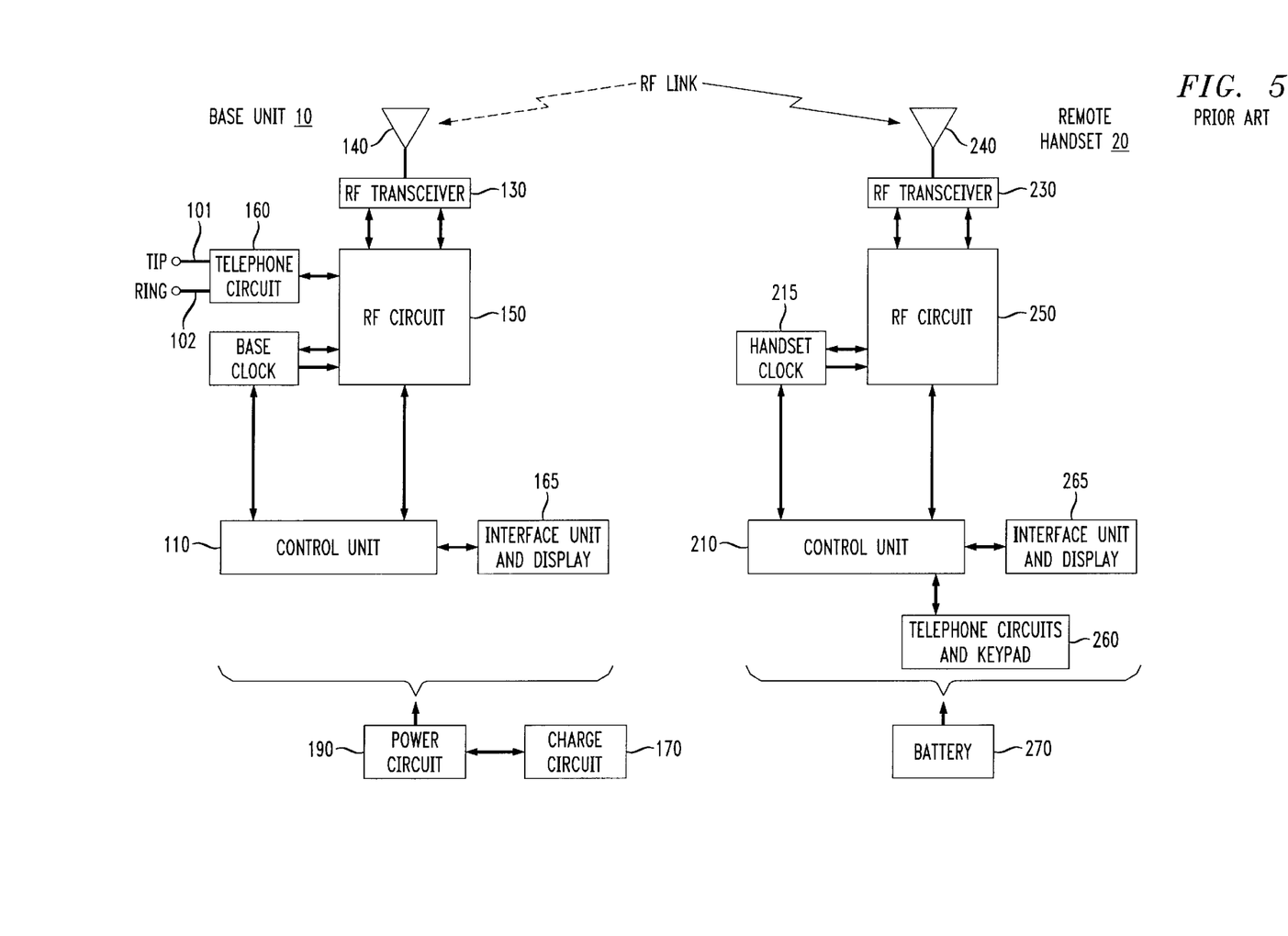
FIG. 5 illustrates an exemplary conventional cordless telephone system.

As a particular example, a cordless telephone system, e.g., shown in FIG. 5, generally includes a stationary unit, e.g., a base unit 10, which communicates with a telephone network (not shown), e.g., public switching telephone network (PSTN). A telephone circuit 160 of the base unit 10 typically communicates with a telephone network by wired communication means, i.e., through the tip and ring lines, 101 and 102, respectively.

The base unit 10 includes a control unit 110, which may be for example, any microprocessor, microcomputer or microcontroller known in the art and readily available from a manufacturer such as Lucent Technologies Inc. of Murray Hill, N.J. The control unit 110 controls the operation of the base unit including the communication to and from the telephone network and to and from a wireless remote handset 20. The interface unit and display 165 provides a user I/O interface to the base unit 10.

The base unit 10 is typically connected to a conventional household AC power outlet via a power circuit 190, which provides an appropriate power level to the base unit 10 derived from the household AC power. The power circuit 190 also provides appropriate power level to a charge circuit 170 that provides a charging signal to one or more charging contacts (not shown) for providing a charging power to a cradled external device, e.g., a wireless remote handset 20.

A conventional cordless telephone system, e.g., the one shown in FIG. 5, also typically includes one or more portable devices, e.g., the wireless remote handset 20, which communicates with the base unit 10 via a radio frequency (RF) link through respective RF front ends including RF circuits 150, 250 and RF transceivers 130, 230. A user of a cordless telephone system may initiate or receive a telephone call using the interface and display unit 265 of the remote handset 20 through the base unit 10, to and from the telephone network.

The remote handset 20 also includes a control unit 210, which may be for example, any microprocessor, microcomputer or microcontroller known in the art and readily available from a manufacturer such as Lucent Technologies, Inc of Murray Hill, N.J. The control unit 210 controls the operation of the base unit including the communication to and from the base unit 10. The interface unit and display 265 provides a user I/O interface to the remote handset 20.

The remote handset 20 typically includes a rechargeable battery 260. The rechargeable battery 260 provides power for the remote handset 20, and may be charged when one or more charge contacts (not shown) of the remote handset 20 are made to be in contact with one or more charge contacts (not shown) of the base unit 10, i.e., when the remote handset 20 is "cradled" in the base unit 10.

The frequency of the handset clock 215 must be in synchronization with the frequency of the base clock 115 in order to establish an RF communication link between the remote handset 20 and the base unit 10. Because of the differences in characteristics of the respective oscillators of the remote handset 20 and the base unit 10, the respective clocks 115 and 215 have a tendency to drift away from each other over time, and thus are required to be synchronized frequently.

The frequency synchronization of the clocks 115 and 215 may be performed at the start of each communication session between the remote handset 20 and the base unit 10. Alternatively, the synchronization may be performed periodically to maintain a reasonable alignment between the clocks in order to be able to quickly establish the RF communication link for each communication session.

Typically, in a conventional radio communication device pair, e.g., comprising the remote handset 20 and the base unit 10 of a cordless telephone system, frequency synchronization therebetween is achieved by one of the pair transmitting a radio frequency synchronization signal that is received by the other one of the pair continuously until the respective oscillators are brought into alignment using known alignment techniques. One common technique uses a Phase Locked Loop (PLL).

For example, the base unit 10 of a cordless telephone system may transmit an RF signal representing a train of pulses at its own clock rate. The remote handset 20 receives the RF signal, and "tunes" its oscillator by aligning its own clock signal to the received pulse rate. A more detailed description of an exemplary clock synchronization via RF signal transmission may be found in U.S. Pat. No. 5,841,823 entitled "METHOD AND APPARATUS FOR EXTRACTING A CLOCK SIGNAL FROM A RECEIVED SIGNAL" issued on Nov. 24, 1998 to Tuijin, the entirety of which is hereby expressly incorporated by reference. A more detailed description of a conventional oscillator alignment method, e.g., a PLL method, may be found in U.S. Pat. No. 5,463,351 entitled "NESTED DIGITAL PHASE LOCK LOOP" issued on Oct. 31, 1995 to Marko et al., the entirety of which is hereby expressly incorporated by reference.

Unfortunately, the above described conventional frequency (or clock) synchronization techniques require that an RF communication channel be tied up for the purpose of the synchronization, thus making the channel unavailable for user communications at least for the duration of the synchronization process.

Because the conventional synchronization is performed by transmission of signals over an RF channel, the conventional techniques are prone to error due to an RF interference. Thus, when there are many sources of RF interference, e.g. other cordless telephones in close proximity, for example, in cordless telephone manufacturing facilities or busy offices, etc., it may be impossible or at least extremely difficult to achieve clock synchronization using the above described conventional technique.

Moreover, because the operation of the RF circuit 250 consumes a significant amount of the power from the battery 270, repeated synchronization may drain the battery 270, and thus shortens the duration that the remote handset 20 may remain portable before a recharge is required.

Furthermore, under rules established by the Federal Communications Commission ("FCC"), a cordless telephone must employ spectrum spreading techniques (frequency hopping) if the power level exceeds a threshold level, e.g., one milliwatt, to minimize interference with other devices using the frequency band. Thus, a high power (i.e., greater than 1 mW) cordless telephone may need to continue an ongoing synchronization effort in another frequency channel thereby adding delay, consuming more power and tying up more frequency channels.

An error during the frequency hopping in a high power cordless telephone as described above may result in the handset hopping to a frequency channel different from the frequency channel of the base unit. In this case, the handset and the base unit must (during a process often referred to as the "registration" process) establish a common frequency channel in order to communicate to each other. Without a common communication channel between the handset and the base unit, the above described conventional frequency synchronization technique cannot be used for the synchronization of the clocks of the handset and the base unit, which may be a required part of the registration process.

Thus, there is a need in the art for a synchronization technique between two wireless devices, e.g., between a wireless remote handset and its base unit, which minimizes or does not require utilization of a wireless communication channel.

SUMMARY OF THE INVENTION

In accordance with the principles of the present invention, a system for and method of synchronizing a clock of a first wireless device with a clock of a second wireless device comprises means for and a step of providing a start transition and an end transition in a charge signal from the second wireless device to the first wireless device, the start transition and the end transition respectively indicating a start of a time duration and an end of the time duration during which a predetermined number of clock pulses of the clock of the second wireless device are counted, means for and a step of counting clock pulses of the clock of the first wireless device during the time duration, and means for and a step of adjusting a frequency of the clock of the first device when the counted clock pulses of the clock of the first device is different from the predetermined number of clock pulses of the second device by more than a predetermined threshold difference level.

In accordance with the principles of the present invention, a wireless device comprises a wireless base unit having a base clock, at least one remote wireless handset having a handset clock and a rechargeable power source, the remote wireless handset being adapted to receive a charge signal from the wireless base unit when cradled in contact with the wireless base unit to charge the rechargeable power source, a counter to count a number of pulses of said handset clock during a predetermined time duration between a start transition and an end transition in the charge signal; and a clock adjustment circuit adapted to adjust the handset clock when the counted number of pulses of the handset clock during the predetermined time duration differs from a number of clock pulses of the base clock counted during the predetermined time duration by more than a predetermined threshold difference level.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention provides a wireless system (e.g., a cordless telephone system) and method for synchronizing clocks of at least two wireless devices, which eliminate or minimize the need for transmission of synchronization signals over the wireless communication channel, e.g., a radio frequency (RF) communication channel.

Figure 1:
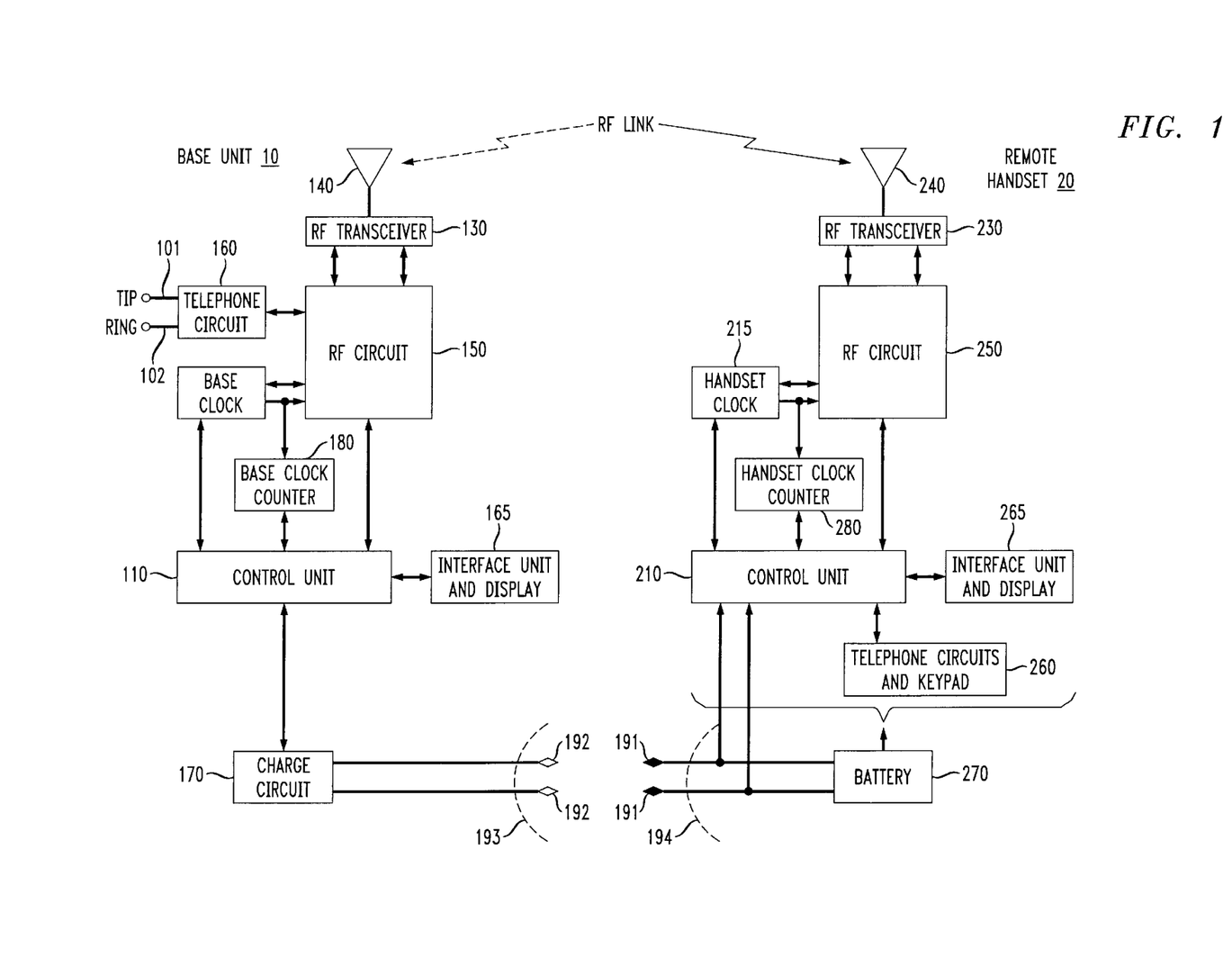
FIG. 1 illustrates an exemplary embodiment of the present invention implemented in a cordless telephone system in accordance with the principles of the present invention.

FIG. 1 illustrates an exemplary embodiment of the present invention implemented in a cordless telephone system in accordance with the principles of the present invention.

Although only one remote handset unit is shown and described herein, it is to be understood that any number of remote handsets may be synchronized with a particular base unit in practicing the principles of this invention.

The cordless telephone system in accordance with the principles of the present invention comprises a base clock counter 180 in the base unit 10 and a handset clock counter 280 in the remote handset 20 to count the number of clock pulses of the base clock 115 and of the handset clock 215, respectively.

Also shown in FIG. 1 are charge contacts 192 in the base unit 10 and charge contacts 191 in the remote handset 20. The charge contacts 191 and 192 are made to come into a physical (or inductive) contact, and thus in an electrical contact, with each other when an appropriate cradle mate portion 194 of the remote handset 20 is cradled (or docked) in the cradle 193 of the base unit 10.

The remaining elements shown in the cordless telephone system of FIG. 1 are otherwise similar to the components having the identical reference numerals, and as already shown and described in reference to FIG. 5.

The base clock counter 180 and the handset clock counter 280 may be formed from any conventionally available counter, e.g. up/down binary counters of any size (e.g., a 16 bit binary counter). Moreover, although shown as separate elements in FIG. 1, the base clock counter 180 and the handset clock counter 280 may be implemented as a part of their respective control units 110 and 210.

To recharge the battery 270, the remote handset 20 is typically inserted into a cradle 193 (typically referred as being "cradled" or "docked") in the base unit 10, and re-charging power (e.g., trickle power) is applied to the battery 270 of the remote handset 20 using the AC current of the base unit 10 through the charge circuit 170 of the base unit 10 and the charge contacts 192.

The charge circuit 170 determines when the remote handset 20 is cradled in the cradle 193, e.g., by detecting the load change at the contacts 191. Upon detection of the handset 20 being cradled in the base unit 10, the charge circuit 170 of the base unit 10 places a charge signal (e.g., in the form of an appropriate current) at the charge contacts 192 to charge the battery 270. Thus, soon after the remote handset 20 being cradled in the base unit 10, a HIGH (active) signal level would be present at the charge contacts 192 as shown in FIG. 2.

Figure 2:
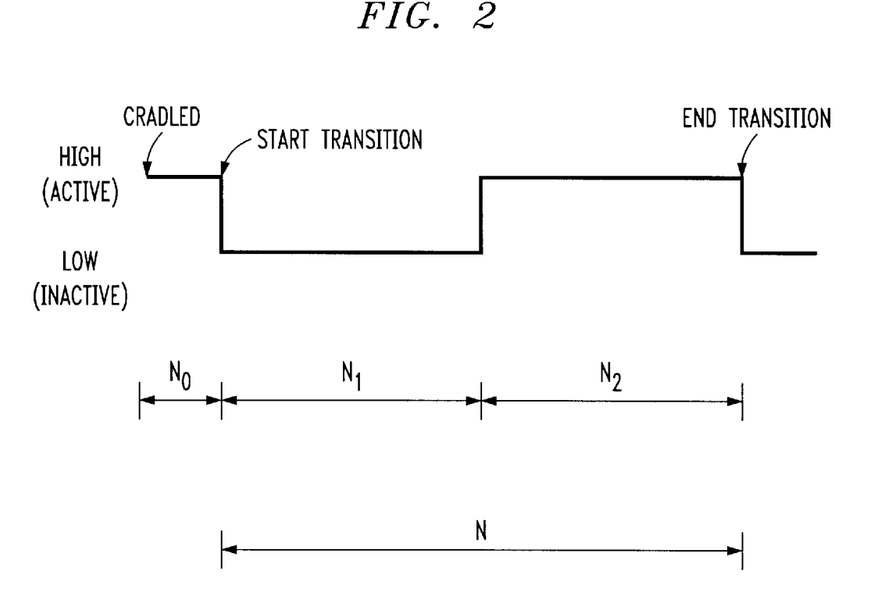
FIG. 2 illustrates an exemplary timing diagram of the charge signal during an oscillator synchronization routine in accordance with the principles of the present invention.

Although in FIG. 2, both the start transition and the end transition are shown to be HIGH to LOW transitions as an illustrative example, it is to be understood that each of the start or end transitions may alternatively be a LOW to HIGH transition.

In accordance with the disclosed embodiment, the remote handset clock 215 is synchronized with the base clock 115 when the remote handset 20 is cradled in the cradle 193, i.e., when the charge contacts 191 of the remote handset 20 are placed in electrical contact with the charge contacts 192 of the base unit 10, allowing recharging of the rechargeable battery 270 in the remote handset 20.

Although in the foregoing and in the following description, the charge contacts 191 and 192 are illustratively described as being in a physical contact with each other during a cradled time, it is to be understood that the physical contact may not be essential to practice the present invention, e.g., when the handset battery. 270 is inductively charged.

During a cradled time, the base unit 10 and the remote handset 20 each perform their own respective oscillator synchronization routines, an exemplary embodiment of which will be described in detail with references to FIGS. 3A and 3B.

Figure 3A:
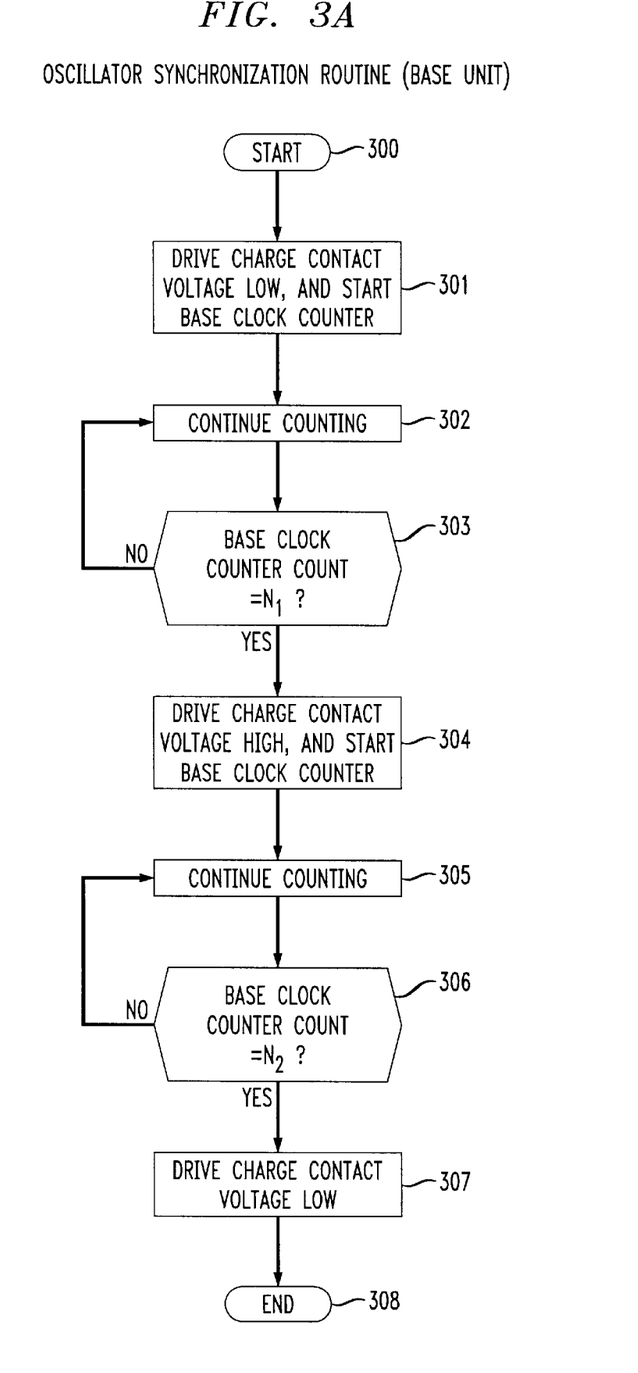
FIG. 3A illustrates a flow chart of the oscillator synchronization routine of the base unit in accordance with the principles of the present invention.
Figure 3B:
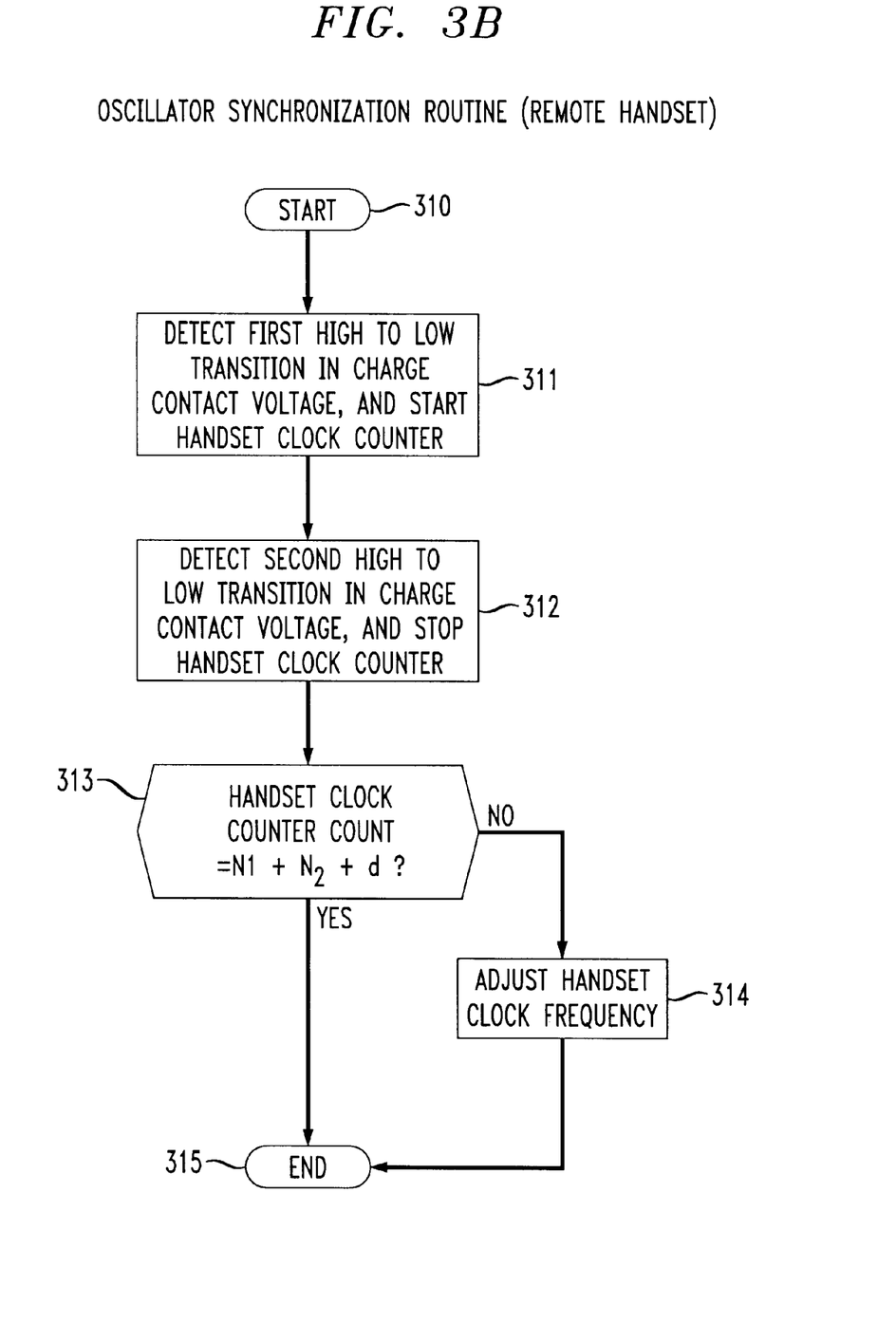
FIG. 3B illustrates a flow chart of the oscillator synchronization routine of the handset in accordance with the principles of the present invention.

FIGS. 3A and 3B show an exemplary flow chart for the oscillator synchronization routines, in accordance with the principles of the present invention, of the base unit 10 and of the remote handset 20, respectively.

In particular, upon detection of the remote handset 20 being cradled in the cradle 193, e.g., by detecting a load change at contacts 192, the charge circuit 170 of the base unit 10 drives the charge signal HIGH (active) as shown in FIG. 2.

In step 300, the control unit 110 of the base unit 10 starts the base unit oscillator synchronization routine after a predetermined time period $N_0$ long enough to provide time necessary for the remote handset 20 to detect the HIGH (active) charge signal at its charge contacts 191. In step 310, after the predetermined time period $N_0$, the control unit 280 of the remote handset 20 initiates its own oscillator synchronization routine.

In step 301, the controller unit 110 of the base unit 10 signals the charge circuit 170 to drive the charge signal LOW (inactive), creating a HIGH to LOW (or an active to inactive) start transition as shown in FIG. 2. At the same time, the controller unit 110 of the base unit 10 signals the base clock counter 180 to start counting the pulses of its own base clock 115.

In step 311, upon detecting the HIGH to LOW (active to inactive) start transition at the charge contacts 191, the control unit 210 of the remote handset 20 signals the handset clock counter 280 to start counting the pulses of its own handset clock 215.

The control unit 110 of the base unit 10 allows the base clock counter 180 to continue to count its own clock pulses until the count, i.e., the output of the base clock counter 180, reaches a predetermined number $N_1$ as shown in steps 302 and 303.

In step 304, when the count reaches $N_1$, the control unit 110 of the base unit 10 signals the charge circuit 170 to drive the charge signal HIGH, and resets the base clock counter 180 to start counting the number of the pulses of the base clock 115 from zero again. The remote handset 20 continues to count its own handset clock pulses despite the LOW to HIGH transition in the charge signal.

The control unit 110 of the base unit 10 in steps 305 and 306 again allows the base clock counter 180 to continue to count its own base clock pulses until the count of the base clock counter 180 reaches a predetermined number $N_2$.

In step 307, when the count of the base clock counter 180 reaches $N_2$, the control unit 110 of the base unit 10 signals the charge circuit 170 to drive the charge signal LOW again creating the HIGH to LOW end transition in the charge signal as shown in FIG. 2.

In step 312, upon detection of the end transition at the charge contacts 191, the control unit 210 of the remote handset 20 sends a halt signal to the handset clock counter 280 to stop counting of the handset clock pulses.

In step 313, the control unit 210 of the remote handset 20 compares the resulting count in the handset clock counter 280 with the sum $N_1+N_2$.

If the resulting count in the counter 280 is within a predetermined tolerance d of the sum $N_1+N_2$, the handset clock 215 is considered to be in synchronization with the base clock 115, and there is no need to adjust the handset clock 215.

If on the other hand the difference between the resulting count in the handset clock counter 280 and the sum $N_1+N_2$ is greater than the acceptable tolerance d, the handset clock is adjusted appropriately by the control unit 210, i.e., the oscillator frequency is decreased or increased depending on whether the count in counter 280 was greater than or less than the sum $N_1+N_2$. The adjustment of the frequency of the oscillator may be achieved by, e.g., using, and by changing the voltage level supplied to, a conventionally available voltage controlled oscillator (VCO) as the oscillator for the handset clock 215.

After the frequency adjustment of the handset clock 215, the entire oscillator synchronization routine as shown in FIGS. 3A and 3B, and as described above, may be repeated as many iterations as needed to bring the handset clock 215 within the acceptable tolerance d of the base clock 115.

The numbers $N_1$ and $N_2$, and the tolerance d may be chosen based on the particular application to achieve the desired degree of synchronization of the clocks. For example, if it is desired to have the clocks tuned to each other within ten (10) parts per million (ppm), the sum $N_1+N_2$ may be chosen to be 100,000 while the tolerance d is chosen to be 1.

Figure 4:
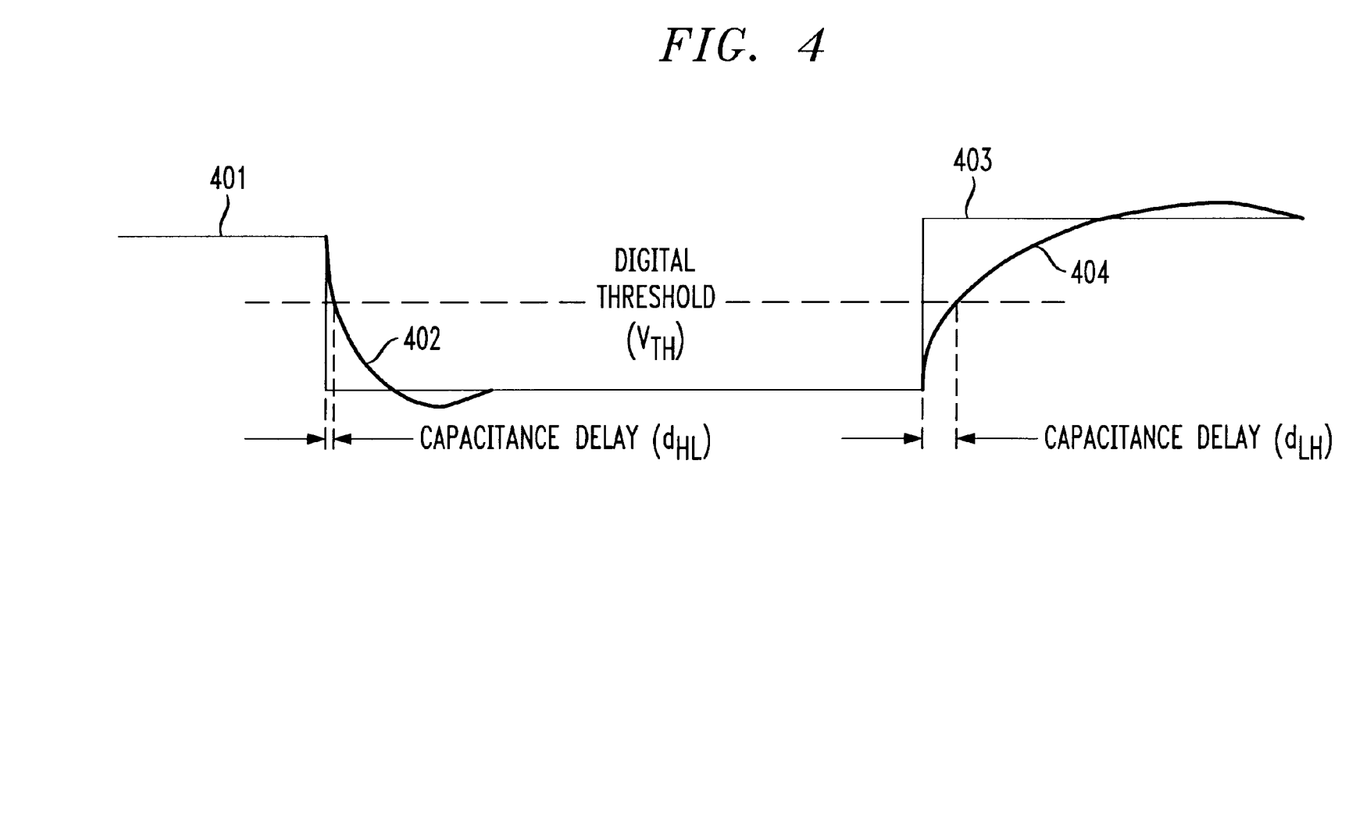
FIG. 4 illustrates an exemplary characteristics curve of the charge signal in accordance with the principles of the present invention at HIGH to LOW and LOW to HIGH transitions.

In FIG. 4, characteristics curves of the charge signal at HIGH to LOW and LOW to HIGH transitions are shown. Because of the characteristics of the circuit capacitance, e.g., of the switching transistors of the base unit 10 and the remote handset 20, the actual signals 402 and 404 do not perfectly follow the ideal square wave curves 401 and 403.

Thus, for example, the control unit 210 of the remote handset 20 may detect the transitions (i.e., detect the actual signal at charge contacts 191 crossing the digital threshold level $V_{TH}$) after a delay from the ideal transition, e.g., the transition in the charge signal at the output of the charge circuit 170.

Moreover, because of, e.g., asymmetrical capacitative characteristics in switching circuits of the remote handset 20, a HIGH to LOW transition of the charge signal may exhibit a capacitance delay $d_{HL}$ different from the capacitance delay $d_{LH}$ of a LOW to HIGH transition. Thus, in order to avoid any possible error resulting from the differences in the capacitance delays, the start transition and the end transition are preferably the same signal level transitions, e.g., both transitions are HIGH to LOW.

It is also preferable that the numbers $N_1$ and $N_2$ are made to equal each other, i.e., by dividing the period N between the start transition and the end transition into two equal parts to minimize the number of required bits of the counters 180 and 280 to count the desired total count, i.e., the sum $N_1+N_2$. For example, a total count of 100,000 may be implemented using a 16 bit counter in each half of the total period N.

However, if the total period N is too long of a duration, e.g., when the counters are slow, it is preferred that each of the numbers $N_1$ and $N_2$ be selected such that the charge signal remains HIGH for as long as possible to provide the most charging power to the battery 270. In this case, for example, $N_1$ is made as short as possible and $N_2$ as long as possible.

Clock synchronization in accordance with the principles of the present invention may be implemented to reduce or even eliminate the need for conventional synchronization over a wireless communication channel. In the alternative, the inventive clock synchronization may be practiced concurrently with otherwise conventional clock synchronization transmitted over wireless communication channel to minimize the frequency of the transmission of otherwise conventional synchronization command information.

Although the exemplary embodiment described above is a cordless telephone system, the present invention may be practiced in any wireless system in which two or more wireless devices require synchronization of respective clocks, and in which contact is at least occasionally provided between the wireless devices.

Although in the exemplary embodiment described above the control units of the base unit and the remote handset implement the inventive clock synchronization, it would be within the contemplation and the scope of the present invention to provide a dedicated module or a circuitry to implement the inventive clock synchronization method.

While in the exemplary embodiment described above the start transition and the end transition are both described to be HIGH to LOW transitions, it would be within the contemplation and the scope of the present invention to provide a LOW to HIGH transition for either (or both) of the start and the end transitions.

While in the exemplary embodiment described above the charge signal from the base unit is described to be transmitted through physical contacts between the charge contacts of the handset and the charge contacts of the base unit, it would be within the contemplation and the scope of the present invention to inductively provide a charge signal from the charge circuit of the base unit through the charge contacts of the base unit to proximately located charge contacts of the handset.

While the invention has been described with reference to the exemplary embodiments thereof, those skilled in the art will be able to make various modifications to the described embodiments of the invention without departing from the true spirit and scope of the invention.

What is claimed is:

1. A method of synchronizing a clock of a first wireless device with a clock of a second wireless device, comprising:
   electrically coupling said first wireless device to said second wireless device;
   providing a start transition and an end transition in a charge signal to indicate a start of said time period and an end of said time period, respectively, said charge signal being provided by said second wireless device to charge a power source of said first wireless device while said first wireless device is electrically coupled to said second wireless device;
   counting pulses of said clock of said first wireless device and pulses of said clock of said second wireless device during a time period indicated by said start transition and said end transition; and
   adjusting a frequency of one of said clock of said first wireless device and said clock of said second wireless device based on said counted pulses of said clock of said first wireless device and said counted pulses of said clock of said second wireless device.

2. The method of synchronizing a clock of a first wireless device with a clock of a second wireless device in accordance with claim 1, further comprising:
   comparing said counted pulses of at least one of said clock of said first wireless device and said second wireless device to an expected number of clock pulses to determine an amount of said adjustment.

3. The method of synchronizing a clock of a first wireless device with a clock of a second wireless device in accordance with claim 1, wherein said step of adjusting said frequency of said clock of said wireless device comprises:
   adjusting said frequency of said clock of said first wireless device to provide said counted pulses of said clock of said first wireless device to be within a predetermined threshold difference level of said counted pulses of said second wireless device.

4. The method of synchronizing a clock of a first wireless device with a clock of a second wireless device in accordance with claim 1, wherein said step of counting clock pulses comprises:
   starting a counter to count said pulses of said first wireless device upon detection of said start transition;
   stopping said counter upon detection of said end transition; and
   providing an output of said counter as said counted pulses of said clock of said first wireless device.

5. The method of synchronizing a clock of a first wireless device with a clock of a second wireless device in accordance with claim 1, wherein:
   said start transition and said end transition are each marked by a high to low transition in said charge signal.

6. The method of synchronizing a clock of a first wireless device with a clock of a second wireless device in accordance with claim 1, wherein said time period comprises:
   a first duration; and
   a second duration.

7. The method of synchronizing a clock of a first wireless device with a clock of a second wireless device in accordance with claim 6, wherein:
   said charge signal is low during said first duration, and said charge signal is high during said second duration.

8. The method of synchronizing a clock of a first wireless device with a clock of a second wireless device in accordance with claim 7, wherein:
   said first duration and said second duration have substantially equal length.

9. The method of synchronizing a clock of a first wireless device with a clock of a second wireless device in accordance with claim 7, wherein:
   said first duration is shorter than said second duration.

10. The method of synchronizing a clock of a first wireless device with a clock of a second wireless device in accordance with claim 3, wherein:

said predetermined threshold difference level is substantially zero.

11. A system for synchronizing a clock of a first wireless device with a clock of a second wireless device, comprising:

means for electrically coupling said first wireless device to said second wireless device;

means for counting pulses of said clock of said first wireless device and pluses of said clock of said second wireless device, said means for counting pulses counts said pulses of said clock of said first wireless device and said pluses of said clock of said second wireless device during a time period, a start of said time period and an end of said time period being indicated by a start transition and an end transition in a charge signal, respectively, said charge signal being provided by said second wireless device to charge a power source of said first wireless device while said first wireless device is electrically coupled to said second wireless device; and means for adjusting a frequency of one of said clock of said first wireless device and said clock of said second wireless device based on said counted pulses of said clock of said first wireless device and said counted pulses of said clock of said second wireless device.

12. The system for synchronizing a clock of a first wireless device with a clock of a second wireless device according to claim 11, further comprising:

means for comparing said counted pulses of said clock of said first wireless device to an expected number of clock pulses to determine an amount of said adjustment.

13. The system for synchronizing a clock of a first wireless device with a clock of a second wireless device according to claim 12, wherein said means for adjusting said frequency of said clock of said first wireless device comprises:

means for adjusting said frequency of said clock of said first wireless device to provide said counted pulses of said clock of said first wireless device to be within a predetermined threshold difference level of said counted pulses of said second wireless device.

14. The system for synchronizing a clock of a first wireless device with a clock of a second wireless device according to claim 11, wherein said means for counting clock pulses comprises:

means for starting a counter to count said pulses of said first wireless device upon detection of said start transition;

means for stopping said counter upon detection of said end transition; and means for providing an output of said counter as said counted pulses of said clock of said first wireless device.

15. The system for synchronizing a clock of a first wireless device with a clock of a second wireless device according to claim 11, wherein:

said start transition and said end transition are each marked by a high to low transition in said charge signal.

16. The system for synchronizing a clock of a first wireless device with a clock of a second wireless device according to claim 11, wherein said time period comprises:

a first duration; and a second duration.

17. The system for synchronizing a clock of a first wireless device with a clock of a second wireless device according to claim 16, wherein:

said charge signal is low during said first duration, and said charge signal is high during said second duration.

18. The system for synchronizing a clock of a first wireless device with a clock of a second wireless device according to claim 16, wherein:

said first duration and said second duration have substantially equal length.

19. The system for synchronizing a clock of a first wireless device with a clock of a second wireless device according to claim 17, wherein:

said first duration is shorter than said second duration.

20. The system for synchronizing a clock of a first wireless device with a clock of a second wireless device according to claim 13, wherein:

said predetermined threshold difference level is substantially zero.

21. A wireless device, comprising:

a wireless base unit having a base clock;

at least one remote wireless handset having a handset clock and a rechargeable power source, said remote wireless handset being adapted to receive a charge signal from said wireless base unit when cradled in contact with said wireless base unit to charge said rechargeable power source; and a control unit adapted to cause an adjustment of a frequency of at least one of said handset clock and said base clock when said frequency of said handset clock measured during a time period indicated by a measurement signal in said charge signal differs from an expected frequency by more than a predetermined threshold difference level.

22. The wireless device according to claim 21, further comprising:

a counter to count pulses of at least one of said handset clock and said base clock during said time period, said time period being marked by a start transition and an end transition in said charge signal.

23. The wireless device according to claim 22, wherein:

said control unit is adapted to compare said counted pulses of at least one of said handset clock and said base clock to an expected number of clock pulses to determine an amount of said adjustment.

24. The wireless device according to claim 23, wherein:

said expected number of clock pulses corresponds to a number of pulses of said base clock during said time period.

25. The wireless device according to claim 23, wherein:

said expected number of clock pulses corresponds to a number of pulses of said handset clock during said time period.

26. The wireless device according to claim 23, wherein:

said control unit is adapted to adjust said frequency of at least one of said handset clock and said base clock to provide said counted pulses of at least one of said handset clock and said base clock to be within a predetermined threshold difference level of said expected number of clock pulses.

27. The wireless device according to claim 26, wherein:

said predetermined threshold difference level is substantially zero.

28. The wireless device according to claim 21, wherein:

said wireless device is a cordless telephone.

29. The wireless device according to claim 21, wherein said time period comprises:
   a first duration; and
   a second duration.

30. The wireless device according to claim 29, wherein:
   said charge signal is inactive during said first duration, and wherein said charge signal is active during said second duration.

31. The wireless device according to claim 29, wherein:
   said first duration and said second duration have substantially equal length.

32. The wireless device according to claim 30, wherein:
   said first duration is shorter than said second duration.

* * * * *